United States Patent
Felzer et al.

[11] 3,888,502
[45] June 10, 1975

[54] ENERGY ABSORBER COMPONENTS FOR USE IN VEHICLES PARTICULARLY MOTOR VEHICLES

[75] Inventors: Bertold Felzer; Klaus Brunk, both of Russelsheim/Main; Friedhelm Kraemer, Hochheim, all of Germany

[73] Assignee: General Motors Corporation, Detroit, Mich.

[22] Filed: Mar. 23, 1973

[21] Appl. No.: 344,445

[30] Foreign Application Priority Data
May 8, 1972  Germany............................ 2222557
Aug. 11, 1972  Germany............................ 2239485

[52] U.S. Cl................ 280/106 R; 293/63; 188/1 C; 296/31 P
[51] Int. Cl............................................. B62d 21/00
[58] Field of Search....... 280/106 R, 106 T; 213/43, 213/1 A, 220; 293/1, 63, 70, 88, 71 R; 267/138, 139, 140; 188/1 C; 296/31 P, 28 R

[56] References Cited
UNITED STATES PATENTS
3,494,607  2/1970  Rusch.................. 267/140
3,633,934  1/1972  Wilfert.................. 280/106 R
3,715,139  2/1973  Tuggle.................. 293/70
3,721,433  3/1973  Sobel.................. 267/140
3,744,338  7/1973  Komatsu.................. 188/1 C X
3,797,873  3/1974  Cook.................. 293/63

*Primary Examiner*—Philip Goodman
*Attorney, Agent, or Firm*—W. E. Finken

[57] ABSTRACT

Energy absorber component for use in vehicles, comprising a hollow elongated metal member having straight walls and a uniform cross-section, filled with foamed plastic material. The member is arranged to be stressed under compression substantially over its entire cross-section by impact forces resulting from collision, whereupon it deforms permanently to absorb energy by uniform collapse of the metal wall. Such components may for example form structural parts of vehicle bodies, or may be incorporated in steering columns, or transmissions, or be situated in other locations of a vehicle where energy absorbing elements are required.

2 Claims, 45 Drawing Figures

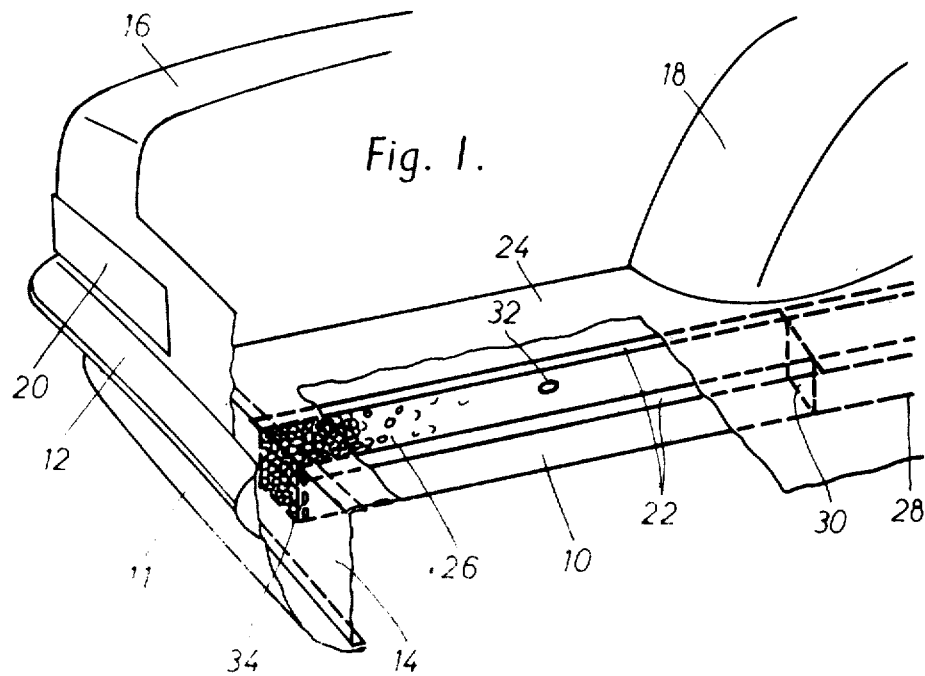
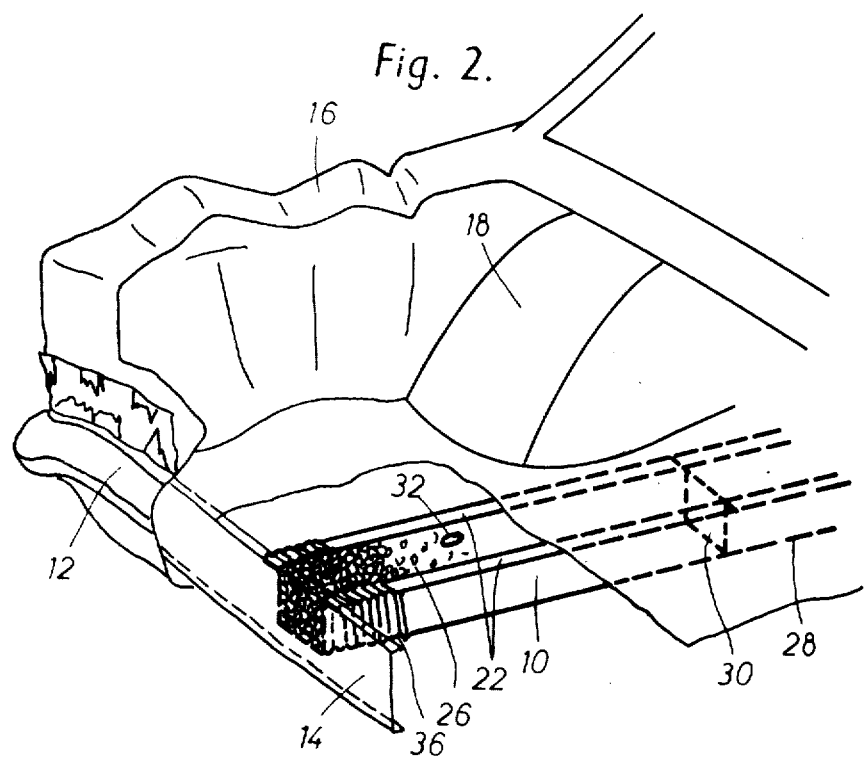

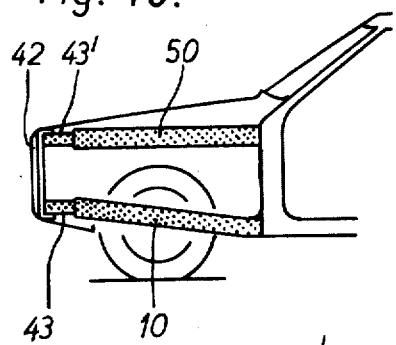
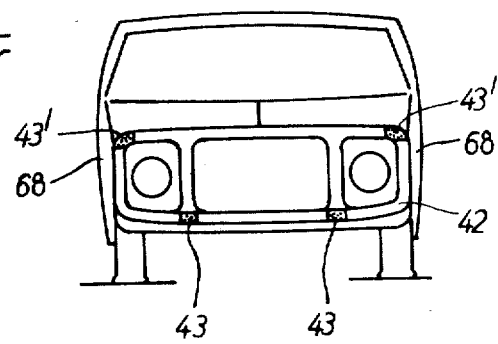
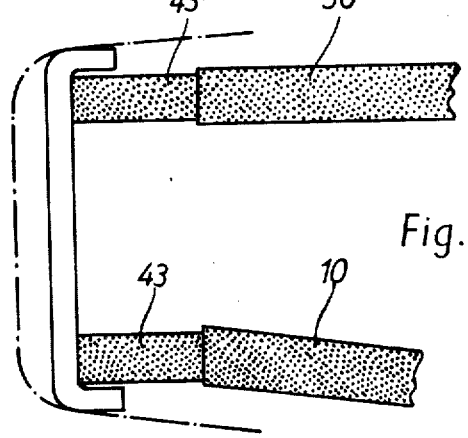
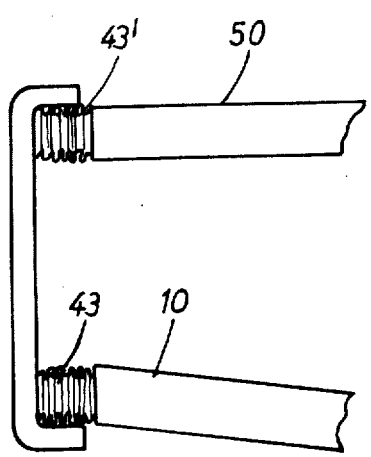
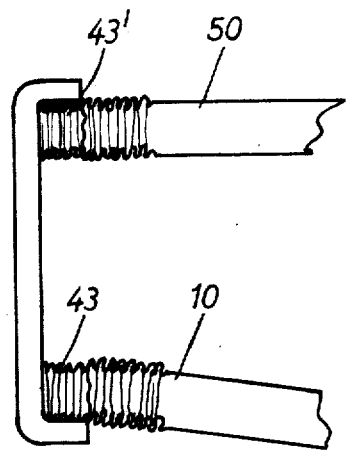

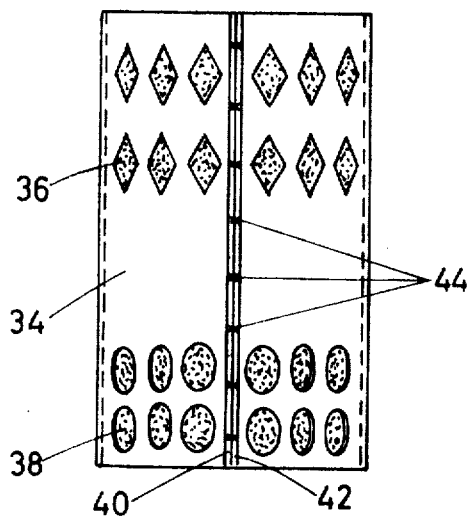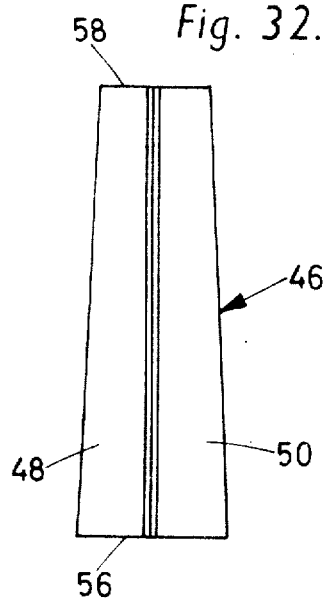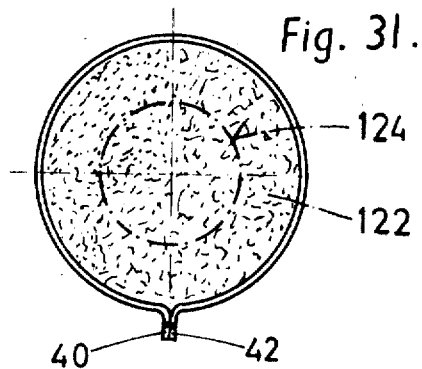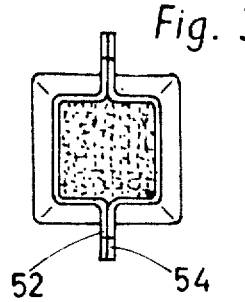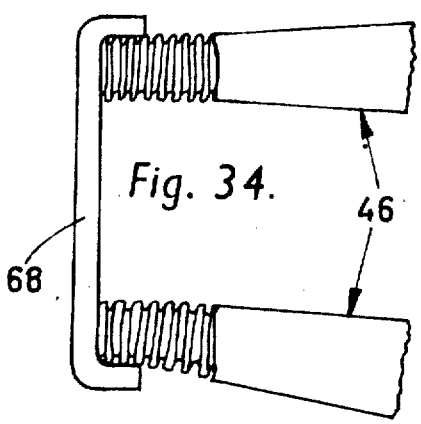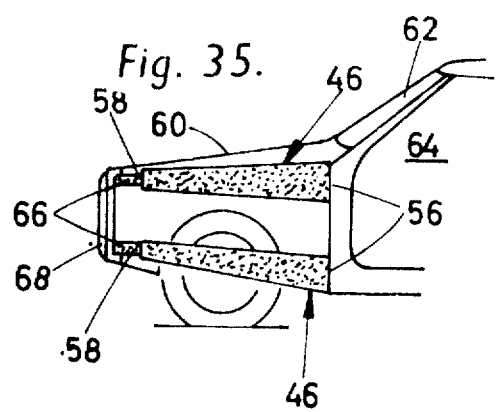

ENERGY ABSORBER COMPONENTS FOR USE IN VEHICLES PARTICULARLY MOTOR VEHICLES

The invention relates to energy absorber components suitable for use in vehicles, particularly motor vehicles, and consisting of a hollow member, the component being stressed under compression in the event of impact from a collision and having a cross-section which is loaded in the main completely by the impact force, with the result that the component deforms substantially over the entire cross-section.

Qualifying as such a component for example, are structural members such as the body side members with their front end portion. These end portions which are located in the so-called crumpling zones of the vehicle, i.e., before or behind the pressure-rigid passenger compartment, are already so designed, or at least fulfill such a purpose that they absorb impact energy in the event of a collision. These side members and their end portions usually consist of a hollow profile section of box-girder shape.

If no arrangements are made with regard to a planned deformation of these side members and their end portions, then, under a correspondingly high impact force they assume a relatively uneven shape. In other words they become so deformed that they first of all develop a high deceleration peak. The succeeding deformation is uncontrolled and again exhibits high deceleration peaks several times more, giving relatively low conversion of impact energy per unit of movement path.

It is already known to provide the girders with planned buckling points at appropriate distances, in such a way that there is a more uniform energy conversion over a longer path, i.e., also over a longer period of time.

The provision of such planned buckling points has the detrimental effect that it requires additional machining of the girder members. Moreover, if the compression strength is not to fall below a certain level, and also if the bending stiffness is not to be reduced inordinately, the girders must be made from a profile section having a greater resistance moment than would be the case if the section were not provided with these planned buckling points.

This problem arises not only in the side member sections lying before and behind the passenger compartment. Indeed, this problem, that is the problem of attaining a planned plastic deformation and therefore an optimum absorption of energy, is encountered in identical or similar manner also with other component parts of a motor vehicle. Among these components may be mentioned for example, the attachment elements for the bumpers, the steering system, the connecting part between roof pillar and over-roll bar, the attachment elements for the instrument panel, and also the propeller shaft. However, this list of components is by no means to be considered as complete. When components are not provided essentially for the specific purpose but can be appropriately designed in accordance with the above problem, it is also possible to furnish additional components giving plastic deformation for intended conversion of energy at those places on a motor vehicle where they are expedient, but have hitherto not been provided there.

Thus all the above-mentioned structural components, and possibly other fresh ones still to be provided, consist of a hollow member. If this hollow member, whose cross-sectional expanse is generally smaller than the length of the member, is loaded with an impact force, then as already stated, a high deceleration peak occurs. However, after a certain deformation of the side-walls of the hollow member has been initiated, it becomes unevenly misshapen, i.e., areas of the side-walls of the hollow member buckle in, with the result that the energy absorption is then irregular and of small amount.

The present invention solves the problem of creating a structural component which ensures a relatively uniform deformation resistance. Moreover, for a required bending strength and work absorption during deformation, it will be possible to reduce the initial cross-section. In connection with a component of the above identified kind, according to the invention these objects are attained by filling up the hollow body with a plastic foam or the like.

As is to be expected, it is true that the plastic foam of itself already brings about a higher absorption of energy, when of appropriate consistency. However, the surprising thing is that with a structural component according to the invention, in the event of an impact, the foam ensures a relatively uniform fold formation of the side walls of the hollow body and therefore an optimum energy absorption. This effect is substantially equal to that resulting from the provision of planned buckling points. The folding of the wall of the structural component takes place from the loaded end of the component substantially over such a length as is necessary for the absorption of impact energy.

By filling the components with foam - an operation which generally requires no special outlay - on the one hand the work absorption is increased by the uniform folding and by the presence of the plastic foam. On the other hand, the deformation resistance is uniform, without the harmful deceleration peaks developing. The foregoing however, involves the condition that the cross-section of the component is such that the latter alone is able to convert energy by deformation, even though in impaired amount.

In contradistinction to the above, German utility model 1 983 413 has made it known to provide a closed hollow member between the bumper and the vehicle body, extending across the entire width of the vehicle and having its interior space filled with a work-consuming plastic foam. Here, as will be readily apparent, just the one effect of the plastic foam is utilised, namely to consume work. Here no mention is made of the effect of the foam on the hollow member itself, i.e., on its envelope. This is proved by the fact that the sheet-metal casing is provided with a stepped portion to promote buckling of the sheet. Furthermore, considering that it extends over the entire width of the vehicle, under the usual loading the sheet metal casing is not utilised entirely for absorbing energy; rather it is stressed more under bending. Hence the effect attained by the present invention cannot occur.

The effect of the present invention, i.e., the attainment of uniform folding of the hollow member can be explained by the fact that when the end face is pressed in, the foam lying directly behind it exerts a force effect on the side walls, with the result that the folding is stabilised.

Any foam having a certain hardness and a certain specific weight (i.e., weight per unit of volume) is suitable as a plastic foam. In addition however, it should preferably be so cross-linked that during its compression, a corresponding yielding towards the side walls causes a pressure to be exerted on same. Therefore, in a further development of the invention, it is proposed to employ a cross-linked hard foam. For the purpose of the invention, a polyurethane foam has proved to be particularly suitable. However, it should be pointed out that in certain circumstances, the effect according to the invention may also be attained with hard foams on a different base; thus for example on the base of polystyrol, polyvinylchloride and the like.

Depending on the Desmophen varieties employed, rigid and non-rigid polyurethane foams may be produced. The specific weight of the foams generally lies between 20 and 600 kg/m$^3$.

In order to attain an appropriate effect, the foam to be used according to the invention - that is to say, its specific weight and hardness - will depend upon the sheet thickness of the hollow member and in certain circumstances, on its cross-section. In turn, these factors depend upon the energy to be absorbed, and on the path within which the energy is to be absorbed. It is therefore difficult to quote a generally applicable specific weight for attaining the effect according to the invention. However it will lie within the order of magnitude between 40 and 400 kg/m$^3$. At a given energy to be absorbed, and with the hollow member substantially designed towards this, the specific weight can easily be determined by tests. The quoted values for the specific weight of 40 to 400 kg/m$^3$ are suitable for a sheet thickness of about 1.5 mm.

A deciding factor is also the pressure under which the foaming out takes place, up to the end in the closed hollow member. The lower limit of the specific weight is determined by the so-called free foaming since the foam must at least fill out the entire hollow body quite well. A non-cross-linked hard foam can also fulfill the effect according to the invention in so far as it is able to exert a pressure on the side walls by granulation or similar splitting off of particles during compression. In the case of such a material, it may be advisable to use it in the form of small particles, e.g., in the shape of balls. It must still be compressible however.

Compressibility is an absolute prerequisite for the effect required. If this compressibility is absent, then if need be, cavities must be created inside the filling material into which the latter can be forced, under a resistance corresponding substantially to that of the outer walls. Another factor vital for the effect is that during its compression, the substance for the filling should not transmit the pressure to the walls simultaneously and uniformly over the entire length of the hollow body in the same way that a fluid would do, but must first transmit pressure solely to the walls lying nearest to the loading point, and then progressively to the further sections of the walls.

Appropriately, the foam in the hollow body is under an initial stress. Again, this initial stress depends to a certain extent on the thickness of the sheet metal. For example, the thinner the sheet, the more folds develop over a certain length.

It is of course advantageous to foam out the hollow body directly, that is, to introduce the constituents and any additions into the hollow body, so that during the solidification inside the hollow member, the plastics material is inflated to foam which then fills out the hollow body quite well. On the other hand, the foam may be introduced after solidification and not until then. It may in fact be introduced either as one single foam portion, or for example, in the form of balls or the like. These balls should be of the smallest possible diameter.

Due to the uniform energy absorption of the structural component, the curve in the force/distance graph runs approximately horizontally after it has steeply risen from zero at the point of origin. It has been found however, that in certain cases there is still a deceleration peak at the commencement of energy absorption. Therefore in its rise from zero, the curve goes somewhat higher first of all, thereupon falling to the uniform and approximately horizontal course, and to its value there. According to a further feature of the invention, this undesired deceleration peak can be avoided by arranging that a planned buckling point is provided for the first folding. In the usual well known manner, this planned buckling point can be attained by a cross-sectional weakening of the walling of the hollow body or by a pre-bent place. The cross-section of the hollow body depends upon the purpose intended for the component part. It may be either angular, especially quadrangular, or round or elliptical.

As will be seen already from the above remarks, the hollow members of the structural component must consist of a material which allows the side walls of this hollow member to fold satisfactorily. Any material fulfilling this requirement may therefore be used. The sheet steel chiefly used in any case at the respective places of the motor vehicle preferably comes into consideration as such a material.

The invention attains an excellent effect if the greatest expanse of the cross-section of the hollow member is smaller than the length of same. In this case, the possibility is afforded of absorbing the energy over a longer path, thus resulting in a smaller deceleration.

Further features of the invention will be apparent from the claims and the following description which quotes various possibilities of application without thereby laying a claim to absolute completeness.

In the drawings:

FIG. 1 is a perspective view of the rear portion of a motor vehicle, partially cut away;

FIG. 2 the same view as in FIG. 1 but after collision;

FIG. 3 a sectional view of the side member portion shown in FIGS. 1 and 2, after an energy conversion;

FIG. 4 a side elevation of the member portion after an energy absorption;

FIG. 5 a side elevation of the member portion after an energy absorption without plastics foam;

FIG. 6 a side elevation of a motor vehicle in which further applications of the structural component according to the invention are indicated in a dotted presentation at the places involved;

FIG. 7 a plan of the vehicle according to FIG. 6;

FIG. 8 a section along line VIII—VIII in FIG. 6;

FIG. 9 also a section along line VIII—VIII in FIG. 6, but with modifications;

FIG. 10 a side elevation of the forward portion of a motor vehicle;

FIG. 11 a front elevation of a motor vehicle;

FIGS. 12, 12a and 12b are views of side members with the bumper and the bumper attachment parts as shown in FIG. 10, but drawn to a larger scale;

Figures 7, 15A:
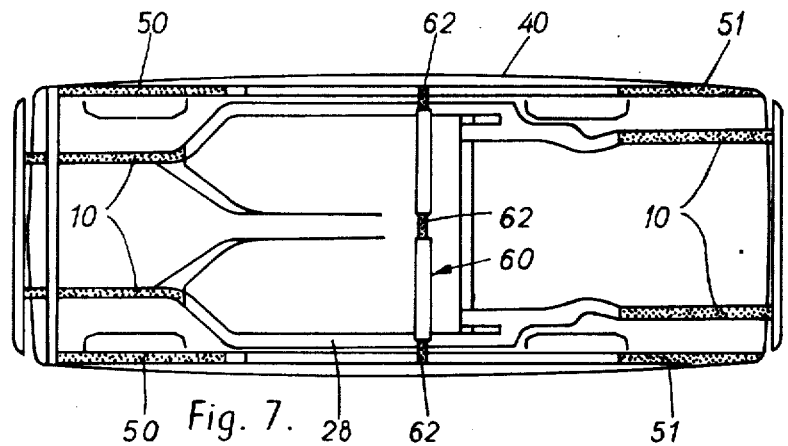
Figure 15:
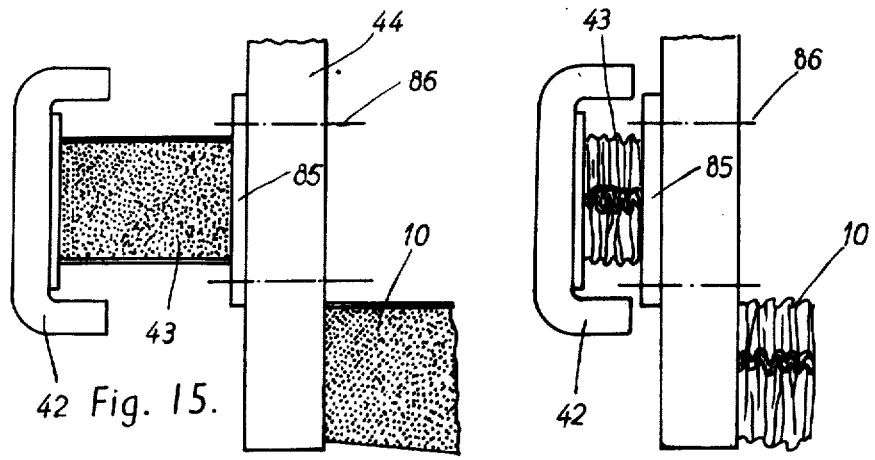
Figure 14:
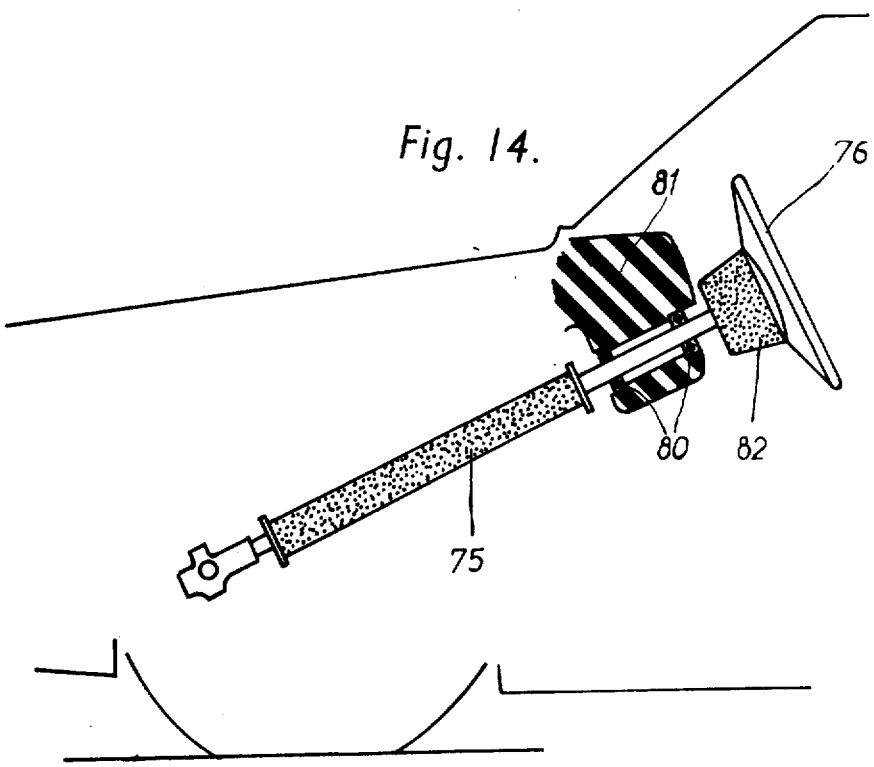
Figure 16:
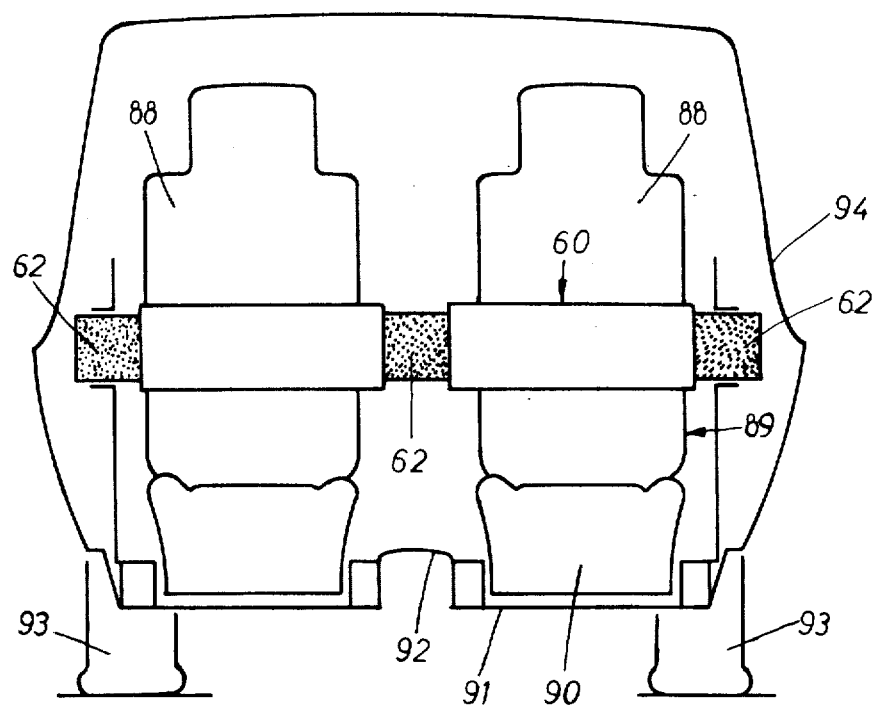
Figures 17, 17A:
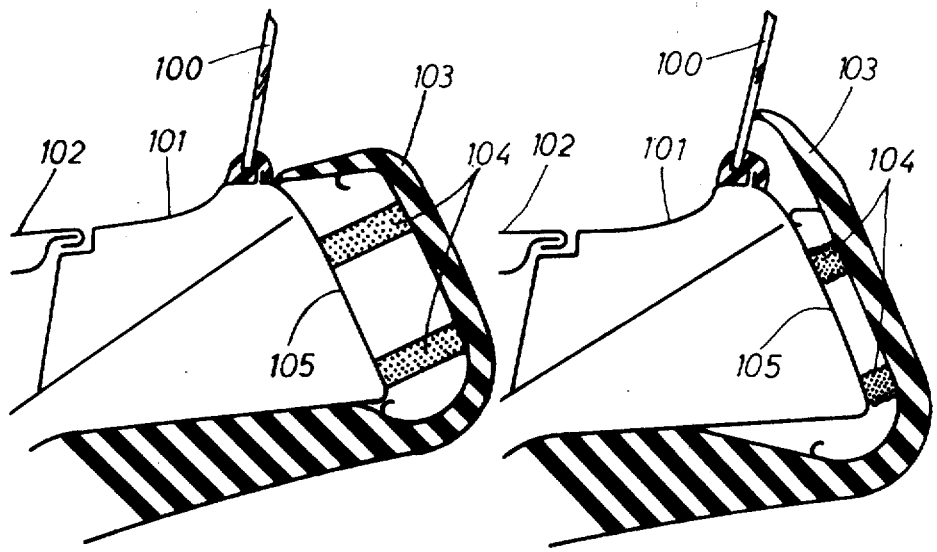
Figure 18:
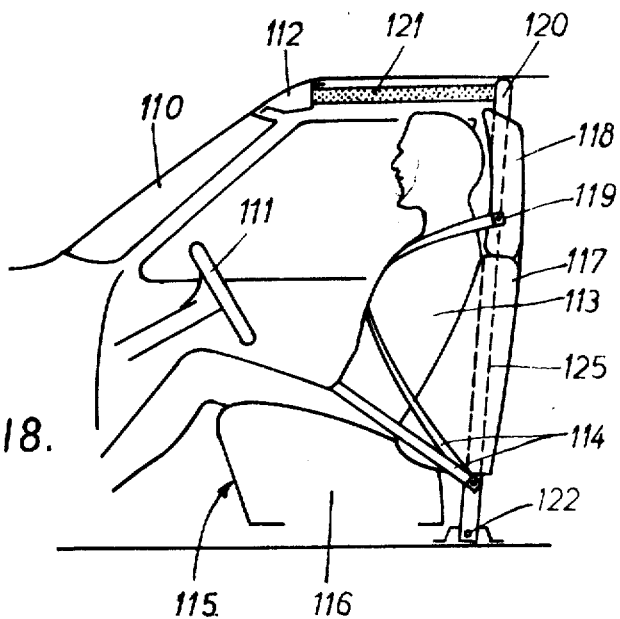
Figure 18A:
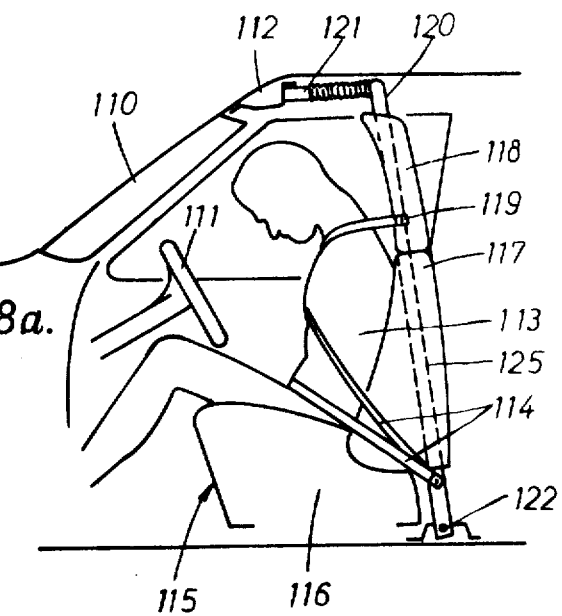
Figure 19:
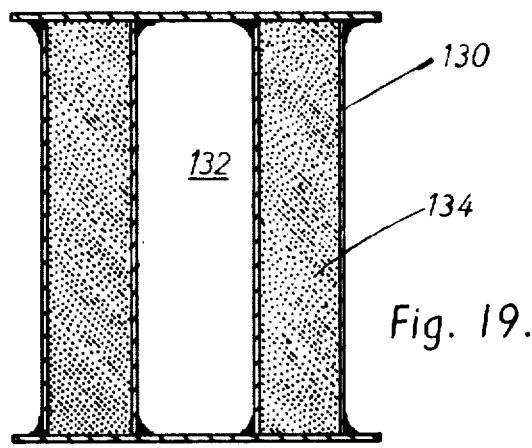
Figure 19A:
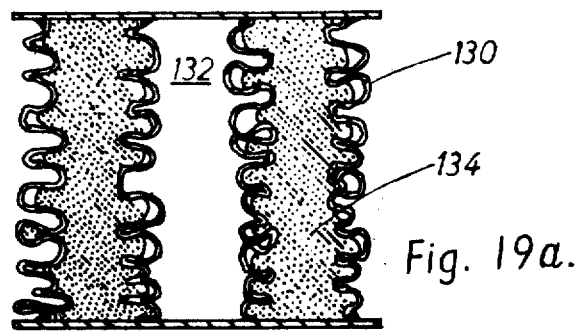
Figure 19B:
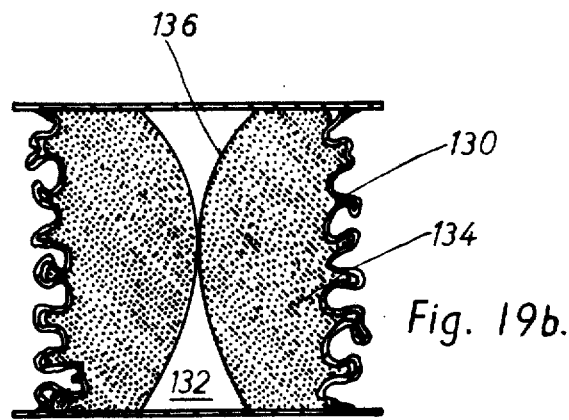
Figure 20:
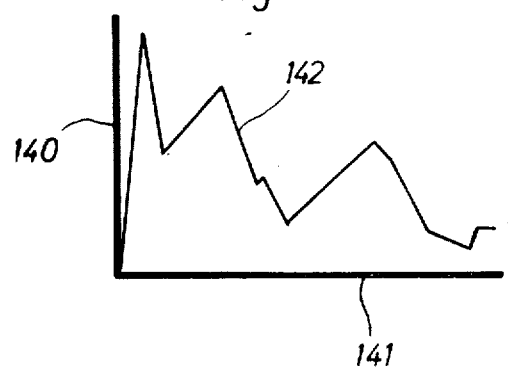
Figure 21:
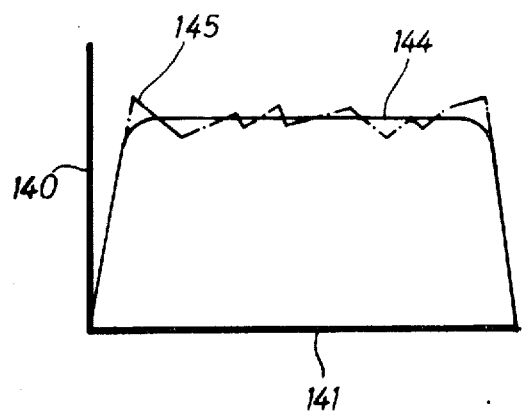
Figure 22:
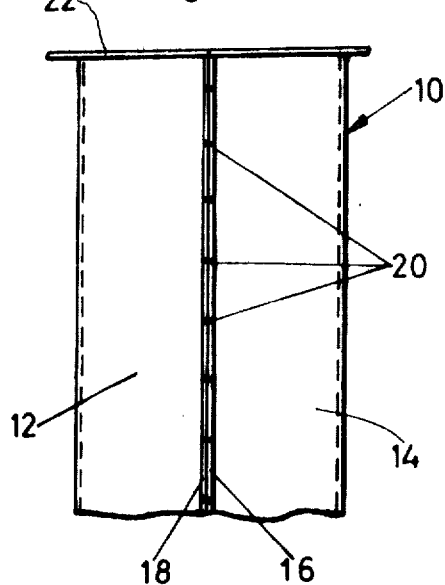
Figure 23:
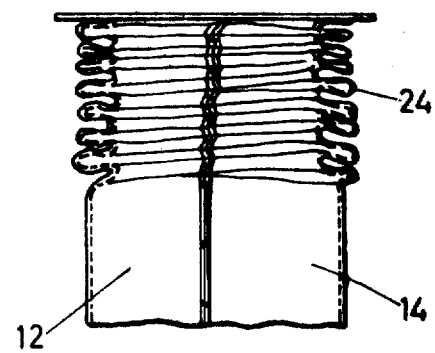
Figure 24:
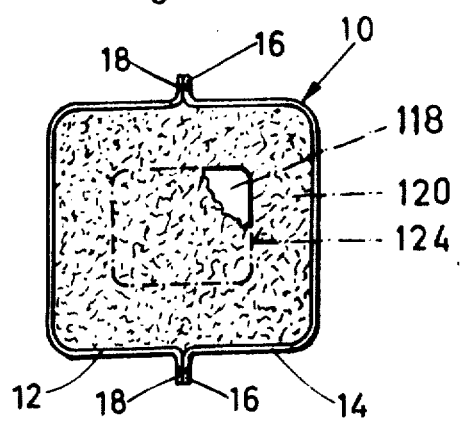
Figure 25:
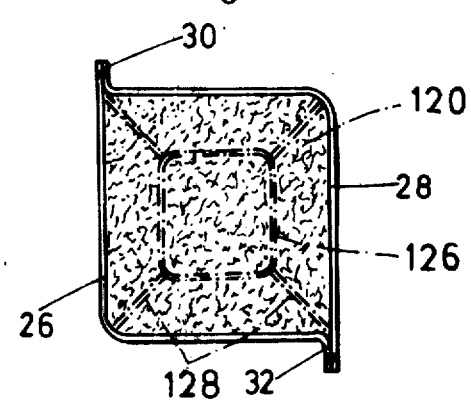
Figure 26:
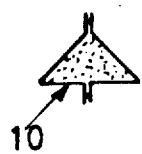
Figure 27:
Figure 28:
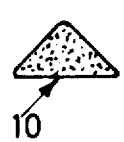
Figure 29:
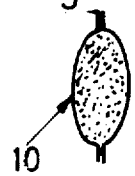
Figure 36:
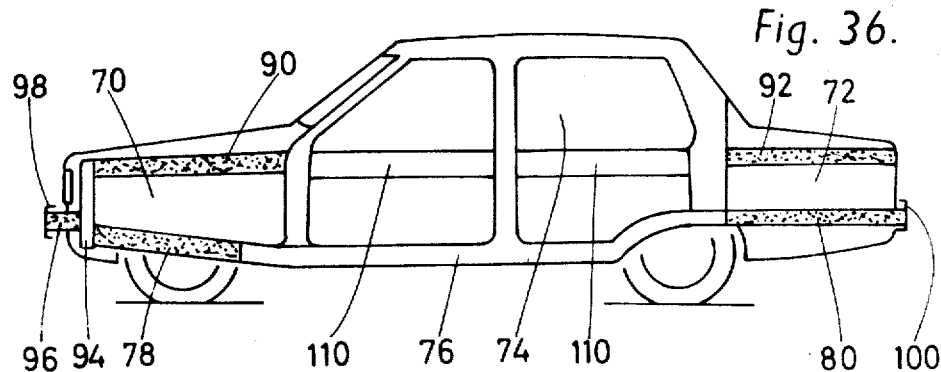
Figure 37:
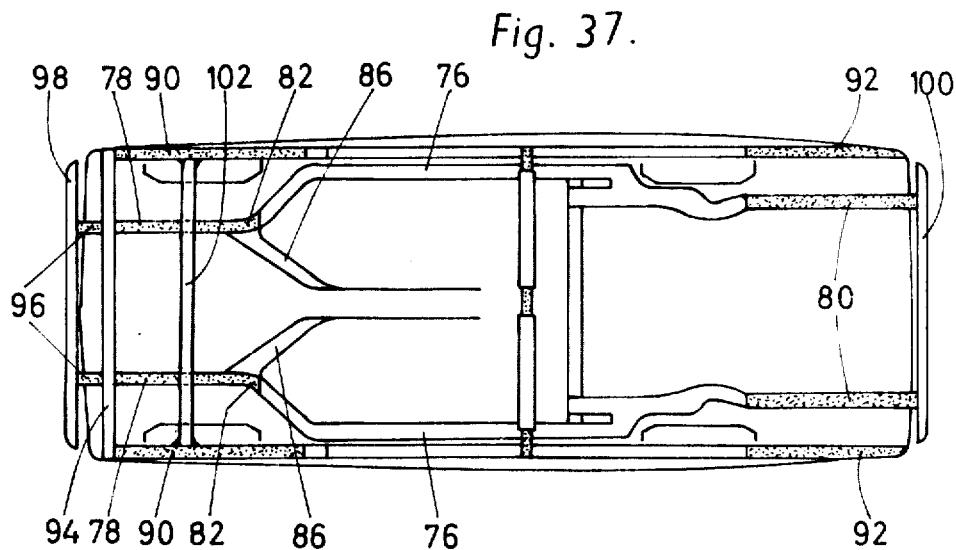
Figure 38:
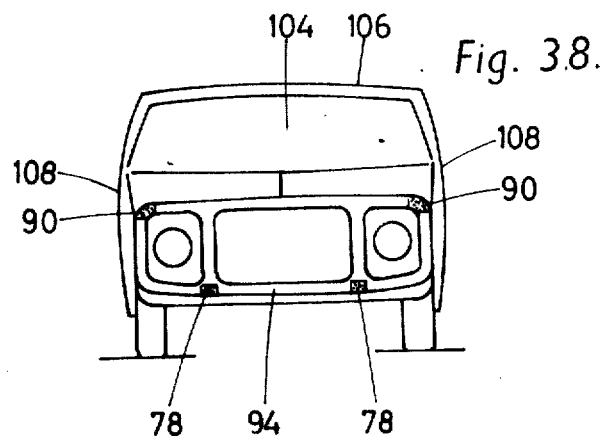

FIG. 14 the steering column with steering wheel and so-called buffer ring;

FIG. 15 the front part of a side member, as well as an impact damper for the bumper bar;

FIG. 15a the impact damper and side member in the deformed condition;

FIG. 16 a further application of the invention to a structural component which protects the vehicle occupants against high lateral accelerations in the event of lateral impact;

FIGS. 17 and 17a a component according to the invention for securing the instrument panel, i.e., both in its initial state and after deformation;

FIGS. 18 and 18a a component according to the invention, as applied between the roof spar and the upper end of a pivotally mounted back-rest, i.e., in its initial state and after absorbing energy, following an impact;

FIGS. 19 – 19b a further embodiment of a component according to the invention, both in its initial state and after stressing under compression;

FIGS. 20 and 21 are two force/distance graphs;

FIG. 22 a side view of a structural component;

FIG. 23 the same component after an energy conversion;

FIG. 24 a section through the component according to FIG. 22;

FIG. 25 a further construction in cross-section;

FIGS. 26 – 29 show further cross-sectional shapes to a smaller scale; FIG. 30 a structural component with break-throughs in the walls;

FIG. 31 a section through the component according to FIG. 30;

FIG. 32 a structural component in conical form;

FIG. 33 a section through the last;

FIG. 34 two structural components in use on the rear or front part of a motor vehicle;

FIG. 35 a motor vehicle front part with passenger compartment added;

FIG. 36 a motor vehicle schematically in side view;

FIG. 37 a plan view thereof;

FIG. 38 a front view of the motor vehicle;

In FIG. 1 reference number 10 denotes the rear portion of a side member 28 of a motor vehicle. The bumper bar 12 is attached to the side member 10 directly or indirectly. A support plate 14 is arranged between rear cover plate 11 and the end of the side member portion 10. The bodywork sheeting forming the trunk compartment is denoted by 16, the wheel arch by 18 and the tail light by 20. As will be apparent, the side member portion 10 is U-shaped in cross-section and, at their upper ends the two lateral portions of the U-form flanges 22 bent at right angles. A separate cover plate is secured to these flange portions 22 or else the sheet 24 of the vehicle floor is connected to the U-shaped side member portion 10 direct, so that in either case the side member or the side member portion forms a box shape.

The side member portion 10 is filled with a plastic foam. Preferably polyurethane foam is used for this purpose. The foam is designated by reference numeral 26 in FIG. 1. If, as is usual, the side member 10 is merely a portion of a continuous girder 28, then of course this latter need only be foam-filled over the lengths at front and rear outside the pressure-rigid passenger compartment. For the purpose of foaming-out, the girder 28 is appropriately provided at the respective place with a partition 30 which confines the space for the plastic foam. Since in no case will the girder 28 collapse in the region of the passenger compartment, the measures adopted according to the invention will not be applied in that region, on the grounds of cost, if for no other reason. The side member portion 10 is closed up at its end face for example by the sheet-metal plate 14.

Foaming-out the side member portion 10 is a simple process known per se, that is just introducing the constituents and any additions through an aperture in the hollow body. In what stage in the development of the rough vehicle body the foaming-out of the side member portion takes place, depends upon the production conditions. The position of this side member portion during foaming-out determines the location of the aperture for introducing the material. This aperture indicated schematically in FIG. 1 and denoted by 32, lies at the most appropriate place, as the case may be. The aperture 32 is closed in suitable manner, after the mixture has penetrated. Reference numeral 34 denotes a planned point of buckling which ensures that the first fold occurs without an undesirable deceleration peak. Appropriately the filler aperture may be utilised as this place of planned buckling. Perhaps it will then be necessary to arrange several such apertures appropriately distributed at this cross-sectional point.

Figure 4:
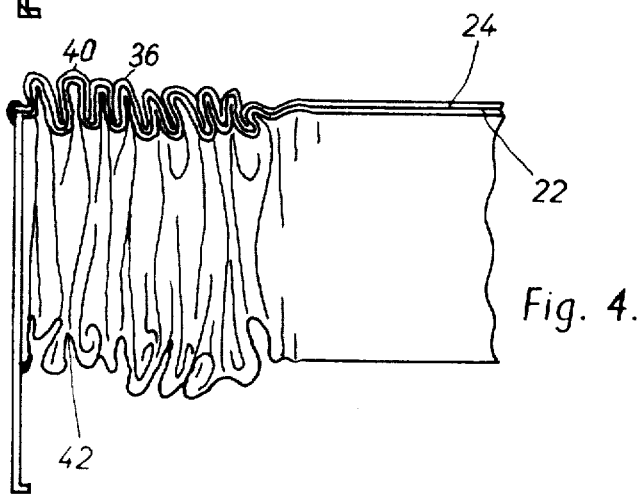
Figure 5:
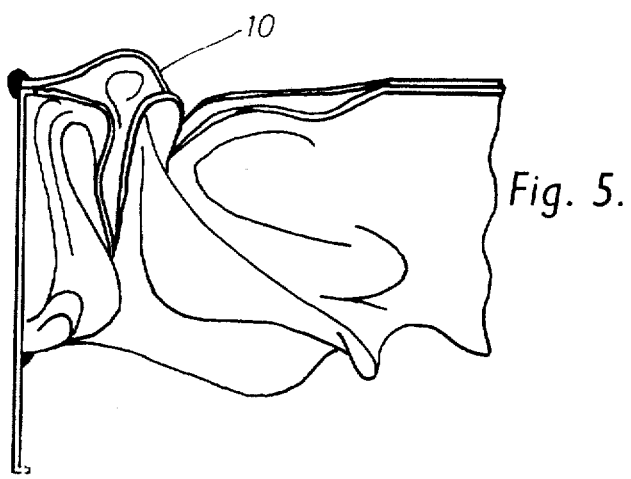

The foaming-out of the side member portion 10 has the effect that it folds together uniformly, continuously from its extremity when a force is exerted in a longitudinal direction upon this side member portion 10. This is apparent from FIG. 2. The cause of this uniform folding together, and consequently the uniform energy conversion, has already been explained and is due to the fact that, after the girder begins to collapse, the foam exerts an outwardly directed pressure on the side walls. The result is that stabilised folding, i.e., a relatively steady and uniform folding, is established. This folding will be apparent once more from FIGS. 3 and 4. Here, at the place outside the foling 36, i.e., at the right-hand section in FIGS. 3 and 4, the girder portion 10 is not appreciably deformed at all. In contrast, FIG. 5 shows the kind of deformation of the girder portion 10 when the latter is not foam-filled. In this case, the girder portion 10 is admittedly first of all rammed in its left-hand end under the action of force. However, the uneven deformation spreads very rapidly along its entire length, so that it then looks somewhat as indicated in FIG. 5. It will be readily apparent that here a high detrimental deceleration peak occurs first of all, whilst the deceleration - and consequently the energy conversion - then fall off very rapidly.

The folding 36 takes place in such a way that when the sheet-metal in the upper walling bends out in upward direction (point 40 in FIG. 4) the lower walling in this plane likewise bends upwards or inwards (point 42). Then, as indicated, the folding takes place in the opposite direction. At the same time the corners are correspondingly beaten down.

If, at the upper side, the end portion 10 together with the sheet 24 of the vehicle floor, forms the hollow member joining this sheet 24 to the flange portions 22, then, due to the folding of these flange portions, the floor sheeting extending away from the latter, is uniformly folded at the same time. The absorption of energy is likewise increased by this.

Figure 3:
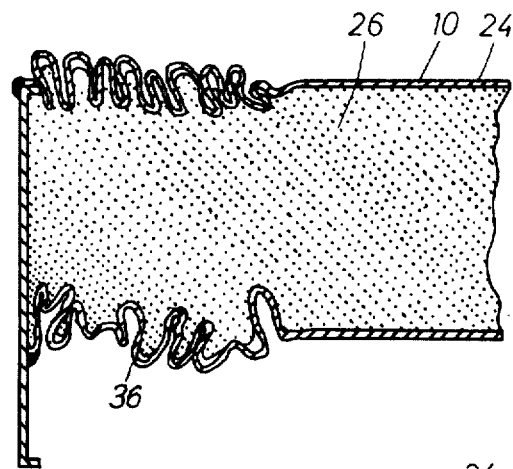

From FIG. 3 it will be apparent how the foam 26 has forced itself into the particular fold. The result is that the energy-absorbing action of the foam is also effective between the folds 36.

Figure 6:
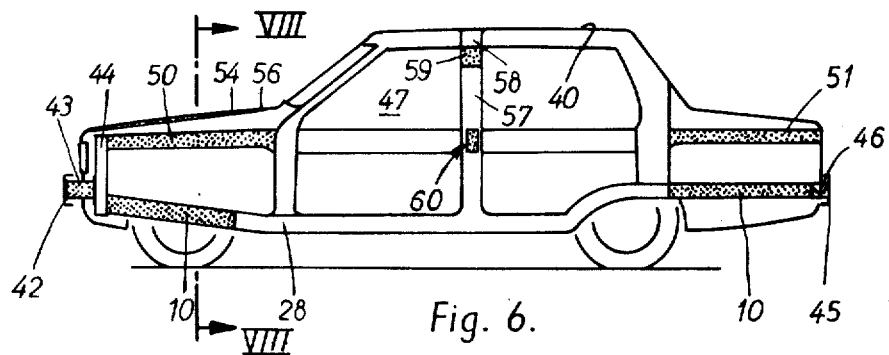

FIGS. 6 and 7 illustrating a motor vehicle in side elevation and plan, show further possible applications. There the vehicle body is denoted by 40. Again, reference numeral 28 designates the lower side member, whose front and rear end portions 10 are filled-out with foam corresponding to FIGS. 1 and 2. Further, in FIGS. 6 and 7, reference numeral 42 designates the forward bumper bar which is secured to the body portion 44 through an impact damper 43. Again, these dampers 43 each consist of a hollow member which is filled out with foam in accordance with the present invention. Further details concerning the impact damper will be discussed later with the aid of FIGS. 15 and 15a. In identical or similar manner as with the front bumper bar 42, the rear bumper bar 45 is also connected to a bodywork part or to the end portions 10 of the side members 28, via impact dampers 46.

As is well known, the present trend is to ensure that both the forward part as well as the rear part of the motor vehicle should be able to absorb or convert as much energy as possible so that the impact force will have no harmful effect on the pressure-rigid passenger compartment. If the energy corresponding to a particular speed is to be absorbed in the forward or the rear part of the vehicle, in certain circumstances the end portions 10 of the side members 28 will not be sufficient. Therefore, in addition to the existing bodywork portions of the forward and rear parts, the invention provides energy-absorbing members 50, 51, which, according to the invention, consist of foam-filled structural components like those forming the end portions 10 of the side members 28. These structural components 50, 51, are located above the end portions 10 and also in the planes of the wheels.

According to the invention, even the engine bonnet 54 may be provided with a component 56 of relatively small cross-section for the purpose of absorbing energy. Reference numeral 58 denotes an over-roll bar. Interposed between this and the door-lock pillar 57, there is a foam-filled intermediate member 59 which is deformed in the event of a roof impact. A cross-member is denoted by 60. In order to absorb lateral impacts, this latter has sections 62 which, according to the invention, consist of foam-filled hollow profile sections. In the case of all these parts, the material can be introduced by foaming-out, or even after foaming-out, that is, either in one piece or in the form of small particles such as balls, for example.

Figure 8:
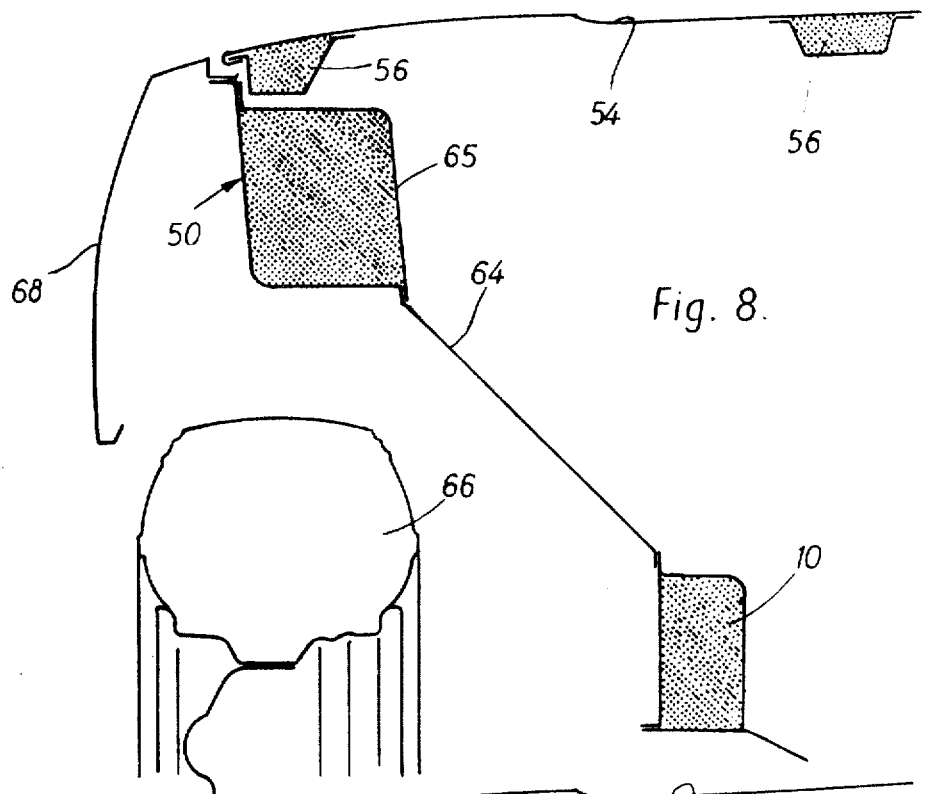

FIG. 8 gives a section along line VIII—VIII in FIG. 6, to an enlarged scale. From this will be seen the energy-absorbing component which, in this case is partially formed by the wheel arch. An additional angle plate 65 creates a quadrangular support which is filled out with foam. The wheel arch 64 is therefore practically the first part to absorb energy at all. In order to increase the energy absorption, the engine bonnet 54 is provided with one or more foam-filled profiles 56. Reference numeral 10 designates an end portion of the side member 28, and 68 denotes the wing. The road wheel is sketchily indicated and bears the reference numeral 66.

Figure 9:
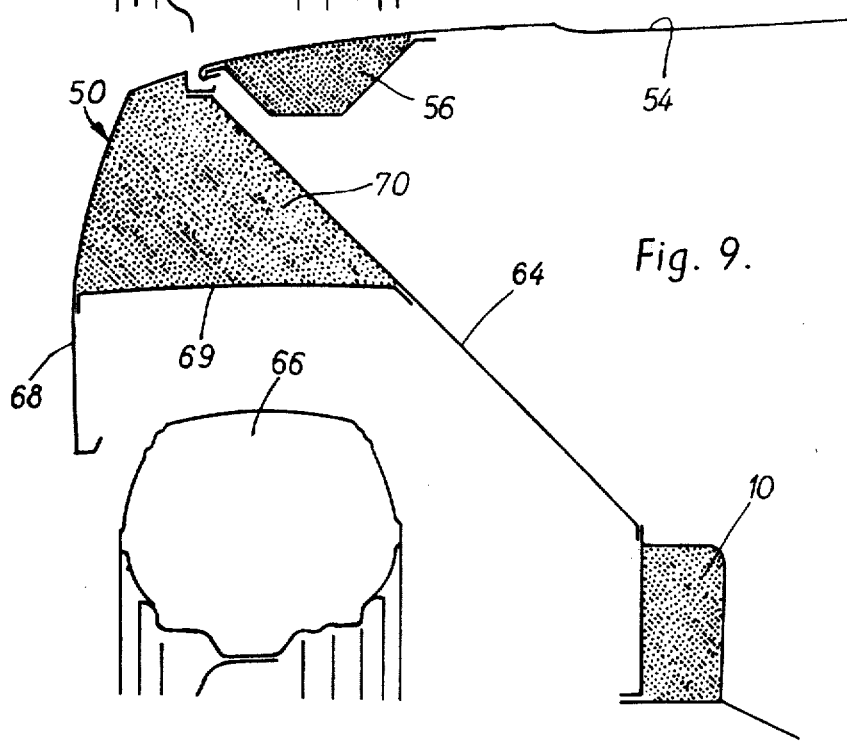

FIG. 9 which is again a section along line VIII—VIII in FIG. 6, illustrates a particularly advantageous step for utilising the wheel arch 64 and wing 68 for absorbing and converting energy. It will be seen that a plate 69 is merely welded-in or otherwise secured between the wing 68 and wheel arch 64, thus resulting in a cavity 70 which is filled out with foam. 54 again shows the engine bonnet with its reinforcement 56. In all these examples where a portion of the bodywork sheet, e.g., the engine bonnet, the wing and the like, simultaneously form a part of the hollow member, the advantage attained is that the bodywork material is compelled to deform by folding, in the same way as the hollow member. Hence the energy destruction is increased still further.

FIGS. 10 to 12b show a further novel possible application of the invention, hitherto unknown even with other means. This concerns the attachment of the buffer bar, that is, of the bumper 42, which is connected to the vehicle body through four impact dampers 43, 43' and not through two of them. The lower dampers 43 lie approximately in the prolongation of the end portions 10 of the side members 28 whereas the upper dampers 43' are arranged in the prolongation of the energy-absorbing structural components 50 located inside the wing 68 and the wheel arch. Here however, the bumper 42 takes the form of an elongated ring having two cross-pieces (FIG. 11). Generally, the purpose of the impact dampers 43, 43' is to ensure that the vehicle suffers no damage when it strikes against an obstacle at a speed of say 16 km/h (10 m.p.h.). At this speed, the dampers 43, 43' are deformed in accordance with FIG. 12a. If the speed with which the vehicle hits an obstacle is greater than 16 km/h, then the end portions 10 of the side members and the structural components 50 become deformed in such a way that no deceleration peaks occur between the deformation of the impact dampers 43, 43' and the end portions 10 or components 50. As FIG. 12b shows, the deformation in the impact dampers 43, 43' and structural components 10, 50 progresses in approximately uniform manner.

Figure 13:
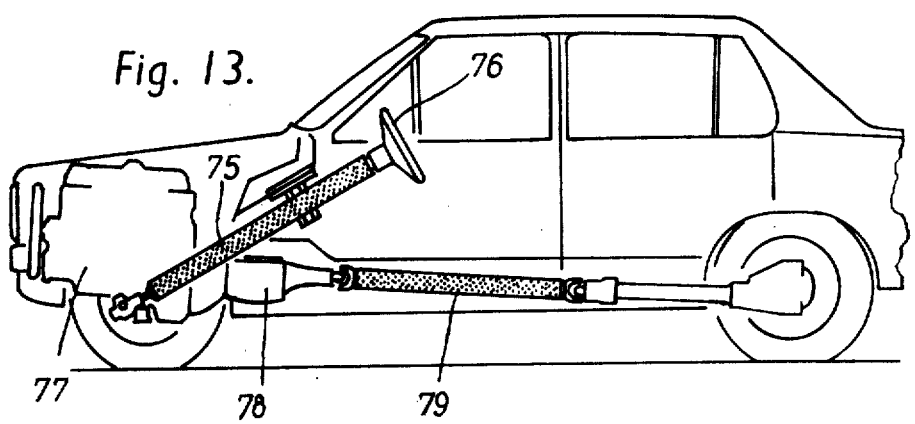
FIG. 13 shows a motor vehicle in side elevation, giving prominence to the steering system and propeller shaft.

The requirement for energy to be absorbed holds good for the steering system also. Therefore FIG. 13 shows the side elevation of a motor vehicle in which the steering column 75 with steering wheel 76 are highlighted in greater prominence. 77 denotes the engine block, 78 the gear transmission and 79 the propeller shaft. The steering column 75 consists of a hollow profile of round cross-section which according to the invention is filled with foam. The steering column 75 is therefore capable of absorbing energy uniformly, that is both a part of the energy which acts from the front on the steering column, as well as that which, in the event of a frontal impact, is inherent in the bodily mass of the driver when he strikes the steering wheel.

In FIG. 14, the steering column 75 takes the form of a foam-filled tube but only in the part in front of the mounting 80 at the instrument panel 81. Arranged between the steering spindle 75 and the steering wheel 76 there is a so-called buffer ring 82 which likewise, in accordance with the invention, consists of a hollow body of round cross-section filled with foam.

Since in the event of a frontal impact, a force is exerted on the engine block 77 which is thereby shifted rearwards, it is advisable to absorb this energy, at least for some part, by the propeller shaft 79. It is therefore a further object of the invention to make the propeller shaft hollow and to fill it with foam in such a way that it converts the energy with appropriate uniformity. This also prevents the propeller shaft from flying out of its joints and it ensures that the engine together with the transmission is not then thrown undamped against the passenger compartment.

FIG. 15 illustrates the attachment of the bumper 42 at the bodywork part 44 by means of the impact damper 43. This latter is connected in the usual manner to the bumper 42 and is provided at its other end with a flange 85 which is secured to the bodywork part 44 by means of bolts 86 (denoted by a centre line only). Again, reference numeral 10 denotes the end portion of the side member 28 (FIG. 6). The attachment and positioning of the damper 43 are only shown by way of example and may be brought about in any other manner. In particular, the bumper 43 may lie in the prolongation of the end portion 10. FIG. 15a shows the deformation of the damper 43 when the vehicle strikes against an obstacle with a speed of less than about 16 km/h (10 m.p.h.). Here the end portion 10 is also shown deformed but this would only occur with a strike at higher speed.

FIG. 16 shows an illustrative cross-section through a motor vehicle, with a front elevation of a cross-member designated by 60 in FIGS. 6 and 7. This cross-member either lies behind the back-rests 88 of the front seats 89, or passes through the back-rest. The seat cushion is designated by 90. In FIG. 16 there are also indicated the vehicle floor 91, the transmission tunnel 92, the road wheels 93 and the outer shell 94 of the vehicle body. The cross-member 60 is provided with sections 62 both between the two back-rests 88 as well as between these latter and the respective side panel of the vehicle body. These sections 62, represented in dots, also consist of a hollow body filled with foam or the like, in accordance with the invention. If a lateral impact against the vehicle takes place, then first of all the respective outer section 62 is deformed by a uniform folding and energy absorption. If the energy of the lateral impact is not completely absorbed by the outer sections 62, then the inner section 62 also comes into action correspondingly.

A further possible application of the structural element according to the invention is illustrated in FIGS. 17 and 17a, in which the windscreen is denoted by 100, the scuttle by 101 and the engine bonnet by 102. The instrument panel 103 is joined to the tranverse portion 105 of the body through structural components 104. In accordance with the invention these components 104 consist of a hollow body with a filling of foam or the like. They may be provided at several places, seen across the width. If they are impressed by an impact force from vehicle occupants thrown forward, then they absorb the energy inherent in the bodily mass of the occupants in a manner which causes them no injury is illustrated in FIG. 17a. In this figure it is apparent that the structural parts 104 are folded together uniformly, with the result that they were able to destroy energy without detrimental deceleration peaks.

FIGS. 18 and 18a show a further possible application of a structural component according to the invention, by way of example. Reference numeral 110 denotes the windscreen and 111 the steering wheel. Above the windscreen, the roof frame 112 is indicated. The driver 113 is strapped to the frame 125 of the back-rest 117 by means of a seat belt system 114. A head restraint 118 is attached to the back-rest 117. The frame 125 of back-rest 117 is provided with an upwardly protruding extension 120. A damping member 121 is arranged between the extension 120 and the roof frame 112. This damping member 121 is designed according to the invention and has the task of ensuring that it absorbs the energy derived from the driver's bodily mass. Meanwhile the damping member 121 becomes deformed as illustrated in FIG. 18a. Since the body of the driver 113 is firmly connected to the seat by means of the belt system, the energy must be taken from the back-rest 117 which however is pivotally mounted at point 122 and supports itself at the damping member 121 by means of the extension 120. The damping member 121 is so designed that again it absorbs energy uniformly without detrimental deceleration peaks.

Of course, the invention is by no means limited to the embodiments illustrated by way of example. It may in fact be applied in all cases where an appropriate operational possibility exists. Even with regard to the structural component according to the invention, there is a diversity of possibilities both with regard to its configuration and as regards its filling. Here the essential thing is that the above described effect with regard to a uniform energy absorption is achieved.

FIG. 19 illustrates a further possible embodiment of the structural component according to the invention. Inside the hollow body 130, a further hollow body is provided. However, only the intermediate space between the hollow bodies 130 and 132 is charged with a filler 134 producing the effect of the invention. If the walling of the hollow body 132 is approximately the same in material and thickness as that of the hollow body 130, then body 132 can be called upon in the same manner as the latter, to absorb energy by fairly uniform folding, as shown in FIG. 19a.

If however the walling of the inner hollow body 132 consists of an expansible material, then the inner hollow body can be deformed, as indicated in FIG. 19b. If it offers an appropriate resistance against its deformation, the expansible walling 136 at the same time allows the outer hollow body 130 to be deformed uniformly by folding, but the incompressible or less compressible filling is able to give way inwards in order to maintain its volume.

FIG. 20 is a force/distance graph. The force is plotted along the ordinate 140 and the distance travelled is plotted along the abscissa. The curve 142 is an approximate record of the behaviour in a structural component which is not foam filled. It will be seen that the curve falls away rapidly but has several peaks which exhibit high deceleration. By way of contrast, FIG. 21 shows the ideal deceleration curve drawn in a full line and denoted by 144. The curve attainable by the present invention will have the approximate course of the dot-dash line 145.

It is possible and even advantageous to introduce foams of differing hardness, seen in the longitudinal direction of the girder. This ensures an energy absorption of progressive characteristic, which is of importance because, with an impact of differing intensity the particular energy present at the time will be destroyed. In a practical execution of this idea for example, foams with differing effects are injected simultaneously through three apertures spaced from each other.

It has been found that a particularly good effect, i.e., a uniform energy conversion over a certain distance is attainable if, according to the invention, the side-walls of the hollow member are formed by sheet steel having a thickness of 0.5 to 1.5 mm and the plastic foam has a volumetric weight of 75 to 200 kg/m$^3$. Appropriately, with a sheet-metal thickness of about 1 mm for the side-walls of the hollow member, a volumetric weight of about 75 to 150 kg/m³ will be provided for the plastic foam.

Apart from plastic foam, any other foam having a definite hardness and volumetric weight, is suitable. In addition however, it should preferably be so cross-linked that, during its compression it exerts a pressure on the side walls by its corresponding yielding towards these latter.

By volumetric weight is meant both the freely foamed volumetric weight as well as the shape-foamed volumetric weight. Free foaming determines the lower value of the volumetric weight. The corresponding shape-foamed volumetric weight is higher because of the compression brought about by external resistance. Both the one volumetric weight as well as the other are of importance for the invention. The main thing is however, that with free foaming the hollow member is completely filled. Of course, it is also possible to introduce the foam material into the hollow member after foaming, which may be done in the form of small particles of ball-shape, for example.

German specification DOS 1 811 453 shows a deformation member which has step-wise decreasing cross-sections in axial direction. This deformation member may be filled with a hard foam. Here again, the effect of the present invention is not aimed at. In fact this effect cannot even be attained because the step-wise decreasing cross-section determines the deformation of the arrangement, whereupon the hard foam which serves only for increasing the energy absorption, has no influence.

It is a preferred condition of the invention that, in the longitudinal direction (direction of loading), the side walls run in a straight line. If their course is not rectilinear, then buckling points tend to be created automatically. In the main, the walls may run parallel with each other. This is appropriate and quite adequate if, due to a relatively short length in relation to the cross-section, there is no risk of buckling. With a greater length however, it may be preferable if the walls are allowed to run conically, thus obviating buckling. In this case, the smaller cross-section will be preferably arranged so as to be pointing in the direction towards the place of loading.

The structural component according to the invention, may be either of drawn material, or composed of two parts which are connected to each other by means of flanges. With the latter type of structural component, the flange-like parts may be located approximately in the middle of two oppositely placed wall portions. If, on account of the position of the component and its connection to adjacent sheet-metal portions of the bodywork it should be found desirable, then the flange-like parts may also be at two opposite corners. It is obvious that any required cross-section can be formed by the structural component or the hollow member. Appropriately, the flange-like parts may be joined by spot welding, with the welding points spaced at a distance of about 20 to 50 mm. In certain circumstances of course, seam welding may also be appropriate, or even essential.

In order to eliminate the risk of collapse or buckling in the structural component, it is preferable if, in addition to the conical or otherwise tapering formation of the structural component, or even without this formation, the rear supporting face or end face is firmly anchored in all directions. In other words, the rear supporting point should be so stable that buckling or deflecting cannot take place at this point. It must not be able to yield, even in the direction of the force action.

When components according to the invention are employed in a motor vehicle, it may happen that two or more of them are disposed in a mirror-image arrangement with respect to a central axis. Then the buckling of these components in the mirror-image disposition may be avoided by arranging that at least two hollow members lying parallel or substantially parallel with each other are connected by means of stays or the like. These may for example, run at right angles to the longitudinal direction of the components.

Further embodiments of the invention will now be explained in detail with respect to FIGS. 22 – 38.

In FIGS. 22 and 23, the structural component 10 consists of a hollow member of somewhat rectangular cross-section. This hollow member is formed from two portions 12 and 14 of U-shaped cross-section which are provided with flange-like projections 16 and 18 respectively, with which they rest against each other. The union of the portions 12 and 14 is brought about by spot welding, and the welding points are denoted in FIG. 22 by reference numeral 20. The frontal closure of the structural component is brought about by a plate 22. The component 10 is filled up with a hard polyurethane foam having a volumetric weight of 75 to 200 kg/m³. The side walls, i.e., portions 12 and 14, consist of sheet steel having a thickness of 0.5 to 1.5 mm. In a vehicle according to FIGS. 36 to 38, the component 10 can be used at the places featured as dotted areas.

Foaming of the structural component 10 is brought about by simply introducing the constituents or a mixture of two constituents into the hollow member through an aperture (not shown). The charge quantity depends upon the volume and the desired volumetric weight, whilst consideration must be given as to whether free foaming or shape-foaming is preferred. When shape-foaming is adopted care must be taken that, to attain the desired volumetric weight, the pressure on the walls is not too high from the outset. During foaming out, the appropriate position for the aperture for the introduction of the constituents or for the mixture will be determined from the position of the side-member portion. Such an aperture is not shown in the drawing. It is closed up in some suitable manner after the introduction of the mixture. The foamed-out structural component 10 has now acquired the property that when stressed under impact or compression, it folds up continuously and uniformly from its end, as is indicated in FIG. 23. As already stated, this uniform folding up in "concertina" fashion, and the uniform energy conversion, is attributed to the fact that, after commencement of the compression of the component, the foam exerts a pressure on the walls. Hence the stabilised folding 24 as illustrated in FIG. 23 is brought about. The higher the volumetric weight, the higher will be the rise of force in the force-distance graph, i.e., the higher will be the deceleration.

Of course, the pressure on the side walls applied through the foam will also tend to bring about a widening or expansion of the component. This will be all the more the case the higher the volumetric weight of the hard foam. If the volumetric weight is too high, then the compression force becomes so intence that it leads to tearing of the girder profile at the welding points. Taking into account economy considerations during welding and, based on the given sheet-metal thickness and the volumetric weight, it is therefore proposed to arrange the spot welding points 20 at a spacing of about 20 to 50 mm. If the volumetric weight is too low, then the supporting effect is not sufficient for attaining a regular fold formation and therefore for achieving a uniform and increased energy absorption.

FIG. 25 shows a further development of the hollow member in cross-section. In this case, a component is formed from two angle plates, 26, 28, each having a flange-like part 30 and 32 respectively, which rests gainst the corresponding side of the other angled portion. Again, the connection is appropriately effected by spot welding. FIGS. 26 to 29 illustrate further cross-sectional shapes where, in order to form the structural component - denoted by reference numeral 10 in all the Figures - two or more correspondingly shaped sheet-metal parts are joined together. Again, the sheet-metal parts are joined together by welding. The building up of the components from several sheet-metal parts welded together, takes into account economic production and application. The invention is however applicable equally well to one-piece hollow members which are produced, for example, in seamless form.

The walls of the hollow member may be provided with perforations. Such a hollow member is illustrated in FIGS. 30 and 31. Here, the hollow member 34 has either four-cornered apertures 36 or round apertures 38. The hollow member 34 or the structural component is here a rolled sheet-metal part whose two flange-like portions 40, 42 contact each other and are joined together by spot welding. In the interests of simplicity, a closure at the end faces is not illustrated. Of itself, such a closure is only absolutely necessary during the foaming process (shape-foaming). During foaming it is necessary to cover any perforations such as 36 or 38. When the foam has hardened, it does not come out of the perforations (or to a slight extent) during deformation of the hollow member.

As tests have shown, uniform folding and a high energy absorption are attained when the volumetric weight of the hard polyurethane foam (which is preferably the material used) amounts to 75 to 150kg/m$^3$. At the same time the sheet-metal thickness amounts to about 1mm. However, even with a sheet-metal thickness of 0.5 mm, an excellent result can be attained at this volumetric weight. This presupposes a certain definite energy absorption. If this should be exceeded then it is advisable to use seam-welded or drawn components in which a foam with a higher volumetric weight can also be used.

The walls of component 10 in FIGS. 22 to 29, or component 34 in FIG. 30, run parallel with each other. This is advantageous for reasons of production technique. When the structural component 10 or 34 has a greater length in proportion to the cross-sectional area, the risk may occur that under the impact of stress, the component 10 tends to buckle at some point. This risk may be eliminated by giving the component a conical or tapering shape as illustrated in FIG. 32, where the component is designated by 46 and consists of two U-shaped elements 48 and 50 which are joined together by means of flange-like parts 52, 54, by spot welding. As FIG. 35 shows, such a component is fitted into the forward part of a motor vehicle in such a way that it points with its smaller end face directed towards the place of loading. In FIGS. 32 and 35, the rear and larger end face is denoted by 56, and the front and smaller end face by 58.

FIG. 35 also indicates the engine bonnet 60, the windscreen 62 and the entrance 64. Impact dampers 66 are arranged at the front end face 58 of the components 46 and these dampers also consist of foamed-out hollow members in accordance with the present invention. A bumper 68 is connected to these components 66. The relation between the end faces 58 and 56 may be in the ratio of 1 : 1.5 for example, assuming a length of about 1 m. In FIG. 34, the structural components are connected directly to the shock absorber 68. Here it is demonstrated how the parts 46 are deformed by folding up in the event of an impact of the vehicle against an obstacle.

The tapering formation of the component 46 according to FIGS. 32 to 34 thus prevents buckling of same within itself. Breaking away or deviation of the component could also take place however, at its rear point of support. Therefore arrangements must be made so as to ensure that this does not occur. Consequently the rear end face or support face must be firmly anchored in all directions. It will be understood that if the structural component, used for example as a side member, buckles inwards or outwards, the folding action - and therefore the energy absorption - can no longer take place to the extent desired.

FIGS. 36 and 37 illustrate a motor vehicle having a forward part 70, a rear end part 72 and a rigid passenger compartment 74. The side members 76 are filled with plastic foam at their front and rear ends 78 and 80 respectively. If the side members 76 follow the course indicated in FIG. 37, appropriately they must be supported at the points 82, for example by additional stays 86, in such a way that the girder does not buckle inwards there. The same also holds good for the girders 90 and 92, which may be included. These are arranged outside and above the side members 76 and they run in the space between wheel arch and wing.

At the front faces, the forward structural components 78 and 90 are connected to a frame-like support 94 which is also apparent from FIG. 38. Secured to this support 94 are impact dampers 96 to which in turn the bumper 98 is secured. The rear bumper 100 is secured directly to the side-member end portions 80.

A further possibility of preventing buckling is to arrange that the two additional girders 90 are connected with a stay 102 or the like, which runs transverse to these girders 90. The side-member end portions 78 and 80 may be similarly connected, if space allows it. An excellent solution for preventing buckling is also provided if the girders 78 and 90, or 80 and 92 are connected together by a frame-like bearer such as 94, appropriately at their central lengthwise section.

Incidentally, FIG. 38 also shows the windscreen 104, the roof 106 and the side panels 108. Members 110 (FIG. 36), placed in the door and in the side panel, may further serve for supporting the girders 90 in axial direction.

The area of the cross-section of the structural components depends on the purpose for which they are intended. As a mean value for component 10 for example, the dimensions may be 100 × 100 mm. As regards the tapered component 46, the measurements 110 × 110 mm for the large end face and 70 × 70 mm for the smaller end face may be assumed as appropriate dimensions.

Tests have confirmed that the desired effect of substantially uniform folding of the sheet metal can also be attained if the plastic foam does not completely fill the component. This can be explained, again with the aid of FIGS. 24, 25 and 31. The plastics foam may be provided with a cavity 118 so that the foam forms a hollow body 120 (FIGS. 24 and 25) and 122 (FIG. 31) for example. The outer surface of this hollow body should contact the inner surface of structural component 10, 34 or 46 as the case may be. The wall thickness of the hollow body 120 or 122 appropriately amounts to half, or less than half, of the cross-sectional area of the component.

The inner surface 124 of the hollow body 120 or 122 of foam material may be formed by the foam itself or by a supporting member 126. In the first case, a bounding wall must be provided for the foaming process only, after which it is removed. This may be provided by an inserted tube or the like, which is removed after the foaming operation. The hollow body 120 or 122 of plastics material may also be produced by the well known method of spraying-on the plastic foam.

The supporting member 126 may, for example, consist of a material which has no energy-absorbing capacity, or only a slight one; in fact, it remains within the structural component. Suitable for this purpose is any rigid material, e.g., thin sheet-metal or plastic. Stays 128 may serve as spacers for securing the position of the supporting member 126. These thrust against the walls of the structural component and are arranged at intervals. In the case of structures which consist of two halves, as shown in FIGS. 24 and 25, and particularly in the case of curved structures, it will be necessary to insert the supporting member with its spacers into the profile section, before welding the half-portions 10, 12 (FIG. 24) or 26, 28 (FIG. 25).

We claim:

1. An energy absorbing structural component for a vehicle comprising, in combination, an elongated enclosed hollow member comprising a plurality of planar longitudinally extending side walls integrally joined by end walls, said side walls being formed of plastically deformable sheet metal collapsible into generally uniform longitudinally adjacent accordion folds under longitudinal impact loads applied to said side walls by one end wall and absorbing the energy of such impact loads by such plastically deformable collapse, and compressible plastic foam encased within and substantially filling said member, said impact loads being applied by said one end wall generally simultaneously to said compressible plastic foam and to said side walls to initiate said collapse of said side walls and compress said plastic foam, said compressed plastic foam initially applying outward pressure under said impact loads to said side walls at the area thereof immediately adjacent said one end wall to initiate collapse of this area of said side walls into an accordion fold containing compressed plastic foam while maintaining the remainder of said side walls in substantially original unfolded shape, said compressed plastic foam sequentially applying outward pressure to succeeding immediately adjacent areas of said side walls to sequentially collapse such areas into like accordion folds and absorb the energy of said impact loads with substantially square wave efficiency, the longitudinal extent of said side walls collapsing into folds being dependent upon the level of the impact loads applied thereto.

2. An energy absorbing structural component for a vehicle comprising, in combination, an elongated hollow member having an axially extending outer wall formed of a plastically deformable material collapsible into generally uniform axially adjacent accordion folds under impact loads applied axially of one end of the wall and absorbing the energy of such impact loads by such plastically deformable collapse, a deformable inner wall telescoped within the outer wall and defining a hollow open ended space therewith, end walls closing the open ends of said space, and compressible plastic foam substantially filling said space, the impact loads being applied by one end wall generally simultaneously to the compressible plastic foam and to one axial end of the outer wall to initiate axial collapse of the outer wall and compress the plastic foam, the compressed plastic foam initially applying outward pressure under the impact loads to the outer wall at the area thereof immediately adjacent the loaded axial end of the outer wall to initiate collapse of this area of the outer wall into an accordion fold containing compressed plastic foam while maintaining the remainder of the outer wall in its substantially original unfolded shape, the compressed plastic foam then sequentially applying outward pressure to succeeding immediately adjacent areas of the outer wall to sequentially collapse such areas into like accordion folds to absorb the energy of the impact loads with substantially square wave efficiency, the axial extent of the outer wall collapsing into folds being dependent upon the level of the impact loads applied thereto, the deformable inner wall deforming under pressure of the compressed plastic foam to accommodate the collapse of the outer wall.

* * * * *